United States Patent
Huang et al.

(10) Patent No.: US 12,111,539 B2
(45) Date of Patent: Oct. 8, 2024

(54) BACKLIGHT MODULE AND DISPLAY PANEL

(71) Applicant: HKC CORPORATION LIMITED, Shenzhen (CN)

(72) Inventors: Hao Huang, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/086,140

(22) Filed: Dec. 21, 2022

(65) Prior Publication Data

US 2023/0408864 A1 Dec. 21, 2023

(30) Foreign Application Priority Data

Jun. 16, 2022 (CN) .......................... 202210681314.7

(51) Int. Cl.
*G02F 1/13357* (2006.01)

(52) U.S. Cl.
CPC .. *G02F 1/133606* (2013.01); *G02F 1/133603* (2013.01); *G02F 1/133608* (2013.01); *G02F 1/133609* (2013.01)

(58) Field of Classification Search
CPC ......... G02F 1/133614; G02F 1/133606; G02F 1/133609; G02F 1/133603; G02F 1/133613
See application file for complete search history.

(56) References Cited

U.S. PATENT DOCUMENTS

| | | | |
|---|---|---|---|
| 2012/0281155 A1* | 11/2012 | Takano | G02F 1/133621 348/790 |
| 2015/0160513 A1 | 6/2015 | Lee et al. | |
| 2016/0282669 A1 | 9/2016 | Lee et al. | |
| 2019/0013446 A1* | 1/2019 | Byun | H01L 33/483 |

FOREIGN PATENT DOCUMENTS

| | | |
|---|---|---|
| CN | 101042481 A | 9/2007 |
| CN | 101206338 A | 6/2008 |
| CN | 101295102 A | 10/2008 |
| CN | 102798060 A | 11/2012 |
| CN | 105068315 A | 11/2015 |
| CN | 105372873 A | 3/2016 |
| CN | 107219679 A | 9/2017 |
| CN | 107966859 A | 4/2018 |

(Continued)

OTHER PUBLICATIONS

The first office action issued in corresponding CN application No. 202210681314.7 dated Feb. 27, 2023.

*Primary Examiner* — Mariceli Santiago
(74) *Attorney, Agent, or Firm* — Hauptman Ham, LLP

(57) ABSTRACT

A backlight module and a display panel are provided. The backlight module includes a backplate, multiple light-emitting sets, a diffuser plate, and an optical film. The diffuser plate and the optical film are stacked. The multiple light-emitting sets are fixedly coupled to the backplate and arranged in array on the backplate. The multiple light-emitting sets are disposed in a gap between the diffuser plate and the backplate. The multiple light-emitting sets each include at least two lamp sources, and the at least two lamp sources are configured to emit different colors to cooperate to emit a white light.

16 Claims, 3 Drawing Sheets

(56) References Cited

FOREIGN PATENT DOCUMENTS

| | | | |
|---|---|---|---|
| CN | 207922072 U | | 9/2018 |
| CN | 109346016 A | | 2/2019 |
| CN | 109799647 A | | 5/2019 |
| CN | 110133907 A | | 8/2019 |
| CN | 111352272 A | | 6/2020 |
| KR | 20170039939 A | * | 4/2017 |

* cited by examiner

BACKLIGHT MODULE AND DISPLAY PANEL

CROSS-REFERENCE TO RELATED APPLICATIONS

This application claims priority under 35 U.S.C. § 119(a) to Chinese Patent Application No. 202210681314.7, filed Jun. 16, 2022, the entire disclosure of which is incorporated herein by reference.

TECHNICAL FIELD

This disclosure relates to the field of display, and particularly to a backlight module and a display panel.

BACKGROUND

In recent years, Mini Light Emitting Diode (LED) technology is in rapid development. Compared with a traditional direct-type backlight module, Mini LED is characterized by high color-gamut, ultra-thinness, etc. For a current traditional Mini LED backlight panel, a quantum dot film is in cooperation with a blue backlight for conversion to obtain a white light, which, however, tends to cause increase in cost of backlight assemblies.

SUMMARY

A backlight module is provided in the disclosure. The backlight module includes a backplate, multiple light-emitting sets, a diffuser plate, and an optical film. The diffuser plate and the optical film are stacked. The multiple light-emitting sets are fixedly coupled to the backplate and arranged in array on the backplate. The multiple light-emitting sets are disposed in a gap between the diffuser plate and the backplate. The multiple light-emitting sets each include at least two lamp sources, and the at least two lamp sources are configured to emit different colors to cooperate to emit a white light.

A display panel is further provided in the disclosure. The display panel includes a backlight module and a liquid crystal panel. The backlight module includes a backplate, a diffuser plate, an optical film, and multiple light-emitting sets. The optical film is stacked on the diffuser plate. The multiple light-emitting sets are fixedly coupled to the backplate and arranged in array on the backplate. The multiple light-emitting sets are disposed in a gap between the diffuser plate and the backplate. The multiple light-emitting sets each include at least two lamp sources, and the at least two lamp sources are configured to emit different colors to cooperate to emit a white light. The liquid crystal panel is disposed opposite to the backlight module. The liquid crystal panel is configured to receive a light emitted by the backlight module for image display.

BRIEF DESCRIPTION OF THE DRAWINGS

In order to describe technical solutions of the disclosure more clearly, the following will give a brief introduction to the accompanying drawings used for describing implementations. Apparently, the accompanying drawings described below are merely some implementations of the disclosure. Based on these drawings, those of ordinary skill in the art can also obtain other drawings without creative effort.

Figure 1:
FIG. 1 is a schematic structural view illustrating a display panel provided in implementations of the disclosure.

Reference numbers: backlight module—100, liquid crystal panel—200, backplate—10, first part—11, connection surface—111, second part—12, driving circuit—13, backlight layer—20, diffuser plate—30, optical film—40, module support—50, support member—60, light-emitting set—21, first lamp source—211, second lamp source—212, third lamp source—213, first light-emitting layer—2111, second light-emitting layer—2112, third light-emitting layer—2121, fourth light-emitting layer—2122.

DETAILED DESCRIPTION

For the convenience of understanding, terms appearing in implementations of the disclosure will be firstly explained.

And/or: only describes an association relationship between associated objects, which means that there can be three relationships. For example, A and/or B can mean A alone, both A and B exist, and B alone.

A plurality of/multiple: refers to two or more than two.

Coupling: should be understood in broader sense. For example, "A is coupled with B" can mean that A and B are in a direct coupling or in an indirect coupling through a medium.

The following will describe clearly implementations of the disclosure with reference to the accompanying drawings.

Implementations of the disclosure provide a backlight module and a display panel, which can simplify the structure of a traditional backlight module and realize direct emission of white lights through cooperation of lamp sources of each light-emitting set of a backlight module. As such, it is possible to reduce cost of the backlight module. Detailed elaborations will be given below.

A backlight module is provided in the disclosure. The backlight module includes a backplate, multiple light-emitting sets, a diffuser plate, and an optical film. The diffuser plate and the optical film are stacked. The multiple light-emitting sets are fixedly coupled to the backplate and arranged in array on the backplate. The multiple light-emitting sets are disposed in a gap between the diffuser plate and the backplate. The multiple light-emitting sets each include at least two lamp sources, and the at least two lamp sources are configured to emit different colors to cooperate to emit a white light.

It can be understood that, the backlight module provided in the disclosure can directly emit white lights with the light-emitting sets. As such, there is no need to provide a quantum dot film layer compared to the related art, which can simplify the structure of the backlight module, reduce a production cost of the backlight module, and reduce difficulty in assembling of the backlight module. The diffuser plate can diffuse a beam(s) of lights emitted by the light-emitting sets, such that lights emitted by the light-emitting sets are evenly distributed and softer. The optical film is disposed at a side of the diffuser plate away from the light-emitting sets. The optical film can select lights passing through the diffuser plate and allow lights that satisfy some angles to pass. The optical film can also transmit lights that do not satisfy such a condition to the diffuser plate, such that lights that do not satisfy the condition are reflected between the light-emitting sets and the diffuser plate and then reach the optical film. A light can exit from the optical film when an angle of the light meets an exit-angle requirement of the optical film. With aid of the optical film, it is possible to improve a utilization rate of lights emitted by the backlight layer, thereby increasing a maximum brightness of an electronic device in use. With increase in brightness, the electronic device can be adapted to more scenarios.

In a possible implementation, the multiple light-emitting sets each include a first lamp source and a second lamp source. The first lamp source includes a first light-emitting layer and a second light-emitting layer, and the second light-emitting layer encloses the first light-emitting layer. The first light-emitting layer and the second light-emitting layer are configured to emit different colors to cooperate to emit a first light of the first lamp source. The second lamp source is configured to emit a second light. The first light is different from the second light in color.

In a possible implementation, the first light-emitting layer is configured to emit a red light, the second light-emitting layer is configured to emit a green light, and the first light is yellow; and the second light is blue. Alternatively, the first light-emitting layer is configured to emit a red light, the second light-emitting layer is configured to emit a blue light, and the first light is magenta; and the second light is green.

In a possible implementation, the second lamp source includes a third light-emitting layer and a fourth light-emitting layer, and the fourth light-emitting layer encloses the third light-emitting layer. The third light-emitting layer and the fourth light-emitting layer are configured to emit different colors to cooperate to emit the second light of the second lamp source. The second light is different from the first light in color.

In a possible implementation, the first light-emitting layer is configured to emit a red light, the second light-emitting layer is configured to emit a green light, and the first light is yellow; the third light-emitting layer is configured to emit a red light, the fourth light-emitting layer is configured to emit a blue light, and the second light is magenta. Alternatively, the first light-emitting layer is configured to emit a blue light, the second light-emitting layer is configured to emit a red light, the first light is magenta; the third light-emitting layer is configured to emit a blue light, the fourth light-emitting layer is configured to emit a green light, and the second light is cyan. Alternatively, the first light-emitting layer is configured to emit a green light, the second light-emitting layer is configured to emit a red light, and the first light is yellow; the third light-emitting layer is configured to emit a green light, the fourth light-emitting layer is configured to emit a blue light, and the second light is cyan.

In a possible implementation, the multiple light-emitting sets each include a first lamp source, a second lamp source, and a third lamp source. The first lamp source, the second lamp source, and the third lamp source each are configured to emit one of a red light, a green light, or a blue light, and the first lamp source, the second lamp source, and the third lamp source are configured to emit different colors to cooperate to emit a white light.

In a possible implementation, the backplate includes a driving circuit. The driving circuit is coupled with the multiple light-emitting sets and is capable of adjusting a current of each light-emitting set separately.

It can be understood that, the driving circuit can drive each lamp source separately, such that the light-emitting sets can emit white lights of different brightnesses. In practice, light-emitting sets at different positions can emit lights of different brightnesses, thereby realizing local dimming of the backlight module. When an electronic device is working, for a part of a display panel where high brightness is needed for display, a light-emitting set(s) corresponding to the part can emit a white light(s) with high brightness. Lamp sources of the light-emitting set(s) have high brightness, which it is possible to improve color gamut of the light-emitting set(s) while increasing brightness of the light-emitting set(s), thereby improving display performance of the electronic device. In contrast, for a part of the display panel where display of black is needed or low brightness is needed for display, a light-emitting set(s) corresponding to the part may emit no light or emit a white light(s) of low brightness, thereby reducing power consumption of the electronic device to realize power saving.

In a possible implementation, the backlight module further includes a module support. The backplate includes a first part and a second part, where the first part is connected with the second part in a bending manner, and the second part are fixedly connected with the module support.

In a possible implementation, the diffuser plate and the optical film each have one end coupled with the second part of the backplate, and the diffuser plate is disposed opposite to the first part of the backplate.

In a possible implementation, the backlight module further includes a support member. The support member has a first coupled with a surface of the backplate provided with the lamp sources, and a second end coupled with a surface of the diffuser plate closer to the light-emitting sets.

It can be understood that, the support member is used for spacing the diffuser plate apart from the light-emitting sets on the backplate, such that a positional relationship between the diffuser plate and the light-emitting sets is relatively fixed, and as such, the diffuser plate can stably receive lights emitted by the light-emitting sets.

A display panel is further provided in the disclosure. The display panel includes a backlight module and a liquid crystal panel. The backlight module includes a backplate, a diffuser plate, an optical film, and multiple light-emitting sets. The optical film is stacked on the diffuser plate. The multiple light-emitting sets are fixedly coupled to the backplate and arranged in array on the backplate. The multiple light-emitting sets are disposed in a gap between the diffuser plate and the backplate. The multiple light-emitting sets each include at least two lamp sources, and the at least two lamp sources are configured to emit different colors to cooperate to emit a white light. The liquid crystal panel is disposed opposite to the backlight module. The liquid crystal panel is configured to receive a light emitted by the backlight module for image display.

The display panel can be applied to an electronic device including, but not limited to, a cellphone, a notebook computer, a tablet personal computer, a laptop computer, a personal digital assistant, a wearable device, an in-vehicle device, etc.

Figure 2:
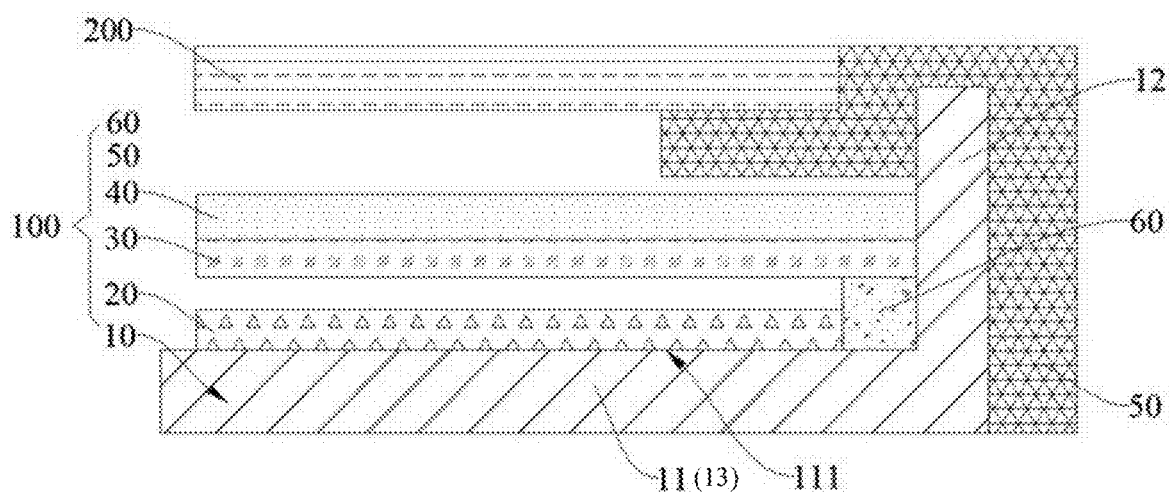
FIG. 2 is a schematic cross-sectional view illustrating a display panel provided in implementations of the disclosure.

Referring to FIG. 1 and FIG. 2, FIG. 1 is a schematic structural view illustrating a display panel 1000 provided in implementations of the disclosure, and FIG. 2 is a schematic cross-sectional view illustrating a display panel 1000 provided in implementations of the disclosure. The display panel 1000 may include a backlight module 100 and a liquid crystal panel 200. The backlight module 100 is disposed opposite to the liquid crystal panel 200, and provides a light source for the liquid crystal panel 200 for image display of the liquid crystal panel 200.

The backlight module 100 may include a backplate 10, a backlight layer 20, a diffuser plate 30, an optical film 40, a module support 50, and a support member 60.

It should be noted that, FIG. 1 only schematically depicts a coupling relationship among the backplate 10, the backlight layer 20, the diffuser plate 30, the optical film 40, the module support 50, the support member 60, and the liquid crystal panel 200, rather than limiting the connection position, structure, and quantity of devices. The structure illustrated in implementations of the disclosure does not constitute any limitation on the display panel 1000. In other implementations of the disclosure, the display panel 1000 may include more or fewer components than illustrated, may combine some components, may separate some components, or may have different arrangements of components. The components illustrated in the drawings may be implemented in hardware, software, or a combination of software and hardware.

Figure 3:
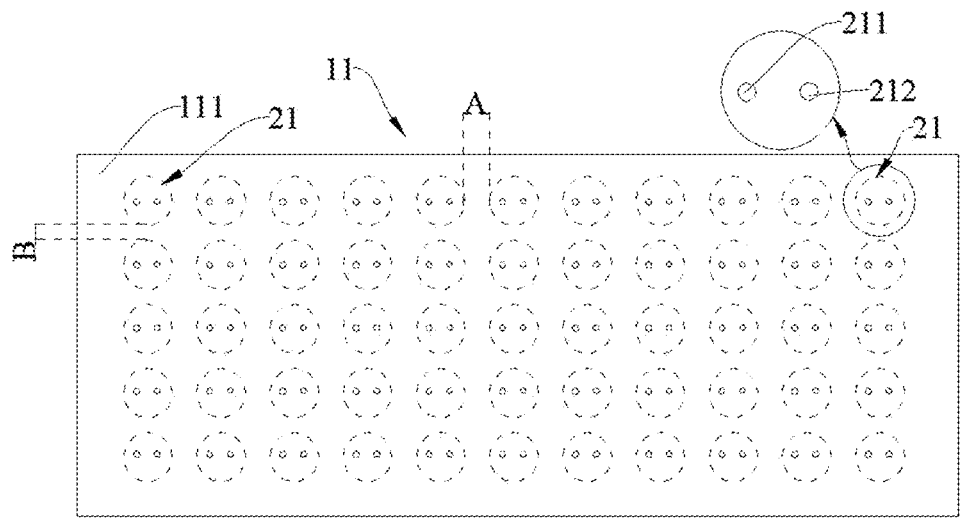
FIG. 3 is a schematic structural view illustrating a backplate and light-emitting sets each having two lamp sources provided in implementations of the disclosure.

Referring to FIG. 2 and FIG. 3, FIG. 3 is a schematic structural view illustrating a backplate 10 and multiple light-emitting sets 21 each having two lamp sources provided in implementations of the disclosure.

The backplate 10 may include a first part 11 and a second part 12. The first part 11 has a connection surface 111, where the connection surface 111 is a surface of the first part 11 coupled with the backlight layer 20. The second part 12 is connected with the first part 11 in a bending manner. In other words, the first part 11 and the second part 12 are disposed at an included angle. The included angle between the first part 11 and the second part 12 may be 900 (within an allowable tolerance range). Specifically, the second part 12 may be extended from the connection surface 111 of the first part 11 along a direction away from the first part 11.

The backplate 10 may be a flexible substrate. For example, the backplate 10 may be made of any one or more of the following materials: Polyimide, Polyethylene Terephthalate (PET), Polyethylene Naphthalate Two Formic Acid Glycol Estr (PEN), Cyclo-Olefinpolymer (COP), Polycarbonate (PC), Polystyrene (PS), Polypropylene (PP), and Polytetrafluoroethylene (PTFE). In other implementations, the backplate 10 may also be a non-flexible substrate, such as glass, ceramics, etc. Implementations of the disclosure are not limited in this regard.

The backplate 10 further includes a driving circuit 13. The driving circuit may be disposed on the connection surface 111 of the first part 11 of the backplate 10. The driving circuit may be a Thin Film Transistor (TFT) driving circuit. The placement manner of the driving circuit is not limited in the disclosure.

The backlight layer 20 may include multiple light-emitting sets 21. The multiple light-emitting sets 21 are fixedly coupled to the connection surface 111 of the first part 11 of the backplate 10. The multiple light-emitting sets 21 are arranged in array on the backplate 10. Exemplarily, the multiple light-emitting sets 21 may be arranged in an array of parallelogram. Specifically, the multiple light-emitting sets 21 may be arranged in an array of rectangle as illustrated in FIG. 3. Along a length direction of the rectangle, the multiple light-emitting sets 21 are spaced apart at first distance A. Along a width direction of the rectangle, the multiple light-emitting sets 21 are spaced apart at second distance B. First distance A may be the same as or different from second distance B.

In implementations of the disclosure, the multiple light-emitting sets 21 each may include at least two lamp sources, that is, a first lamp source 211 and a second lamp source 212, and/or a third lamp source (not illustrated) that will be described below. For each of the multiple light-emitting sets 21, lamp sources of the light-emitting set 21 are configured to emit different colors. Since the lamp sources of the light-emitting set 21 emit different colors, based on a principle of the three primary colors of light, lights of different colors emitted by the at least two lamp sources can be combined together to obtain a white light.

In a possible implementation, a distance between any two lamp sources may be shorter than or equal to 1 millimeter.

In implementations of the disclosure, the multiple light-emitting sets 21 are electrically coupled with the driving circuit. For each of the multiple light-emitting sets 21, the driving circuit can adjust a current of each lamp source of the light-emitting set 21 separately, thereby adjusting a brightness of each lamp source. Specifically, for each of the multiple light-emitting sets 21, the driving circuit may adjust each lamp source of the light-emitting set 21 separately, such that brightnesses of multiple lamp sources of the light-emitting set 21 change by the same magnitude, thereby adjusting a brightness of the light-emitting set 21 without changing a color temperature of the light-emitting set 21. For each of the multiple light-emitting sets 21, the driving circuit can also adjust currents of multiple lamp sources of the light-emitting set 21 by different magnitudes, such that brightnesses of the multiple lamp sources of the light-emitting set 21 change by different magnitudes, thereby changing the color temperature of the light-emitting set 21 or changing both the color temperature and the brightness of the light-emitting set 21.

It can be understood that, the driving circuit can drive separately each lamp source of each light-emitting set 21, such that the light-emitting sets 21 can emit white lights of different brightnesses. In practice, light-emitting sets 21 at different positions of the backplate 10 can emit lights of different brightnesses, thereby realizing local dimming of the backlight module 100. When the display panel 1000 is working, for a part of the display panel 1000 where high brightness is needed for display, a light-emitting set(s) 21 corresponding to the part can emit a white light(s) with high brightness, that is, lamp sources of the light-emitting set(s) 21 corresponding to the part have high brightness. As such, it is possible to improve color gamut of the light-emitting set(s) 21 while increasing brightness of the light-emitting set(s) 21, thereby improving display performance of the display panel 1000. In contrast, for a part of the display panel 1000 where display of black is needed or low brightness is needed for display, a light-emitting set(s) 21 corresponding to the part may emit no light or emit a white light(s) of low brightness, thereby reducing power consumption of the display panel 1000 to realize power saving.

Referring to FIG. 2 again, the diffuser plate 30 and the optical film 40 are stacked. The diffuser plate 30 and the optical film 40 each have one end coupled with the second part 12 of the backplate 10, and the diffuser plate 30 is disposed opposite to the first part 11 of the backplate 10. The multiple light-emitting sets 21 are disposed in a gap between the diffuser plate 30 and the backplate 10.

The diffuser plate 30 can diffuse lights emitted by the light-emitting sets 21, such that lights emitted by the light-emitting sets 21 are uniform and softer. The optical film 40 is disposed at a side of the diffuser plate 30 away from the light-emitting sets 21. The optical film 40 can select lights passing through the diffuser plate 30 and allow lights that satisfy some angles to pass. The optical film 40 can also transmit lights that do not satisfy such a condition to the diffuser plate 30, such that lights that do not satisfy the condition are reflected between the light-emitting sets 21 and the diffuser plate 30 and then reach the optical film 40. A light can exit from the optical film 40 only when an angle of the light meets an exit-angle requirement of the optical film 40. As such, with aid of the optical film 40, it is possible to improve a utilization rate of lights emitted by the backlight layer 20, thereby increasing a maximum brightness of the display panel 1000 in use. With increase in brightness, the display panel 1000 will have a higher color-gamut, such that the display panel 1000 can be adapted to more scenarios.

The support member 60 has two opposite ends. One end of the support member 60 is coupled to the connection surface 111 of the backplate 10 on which lamp sources are disposed, and the other end of the support member 60 is coupled to a surface of the diffuser plate 30 facing the light-emitting sets 21. The support member 60 is used for spacing the diffuser plate 30 apart from the light-emitting sets 21 on the backplate 10, such that a positional relationship between the diffuser plate 30 and the light-emitting sets 21 is relatively fixed, and as such, the diffuser plate 30 can stably receive lights emitted by the light-emitting sets 21. Exemplarily, the support member 60 may be made of rubber which can experience elastic deformation. As such, the support member 60 can act as a buffer for the diffuser plate 30 and the backplate 10 when the backlight module 100 is subjected to an impact or other external forces, thereby improving anti-impact performance of the diffuser plate 30 and the backplate 10.

The backplate 10 is fixed to the module support 50 through the second part 12. The light-emitting sets 21, the diffuser plate 30, and the optical film 40 are fixedly coupled with the module support 50 through the backplate 10. The liquid crystal panel 200 is fixed to the module support 50 and located at a side of the optical film 40 away from the diffuser plate 30, and the liquid crystal panel 200 is disposed opposite to the optical film 40.

It can be understood that, once the light-emitting sets 21 disposed on a surface of the backplate 10 emit lights, lights emitted by the light-emitting sets 21 will be diffused by the diffuser plate 30 and thus become uniform and softer. Then lights will converge after passing through the optical film 40, that is, the optical film can unify propagation directions of lights. Lights which exited from the optical film 40 can reach the liquid crystal panel 200, thereby realizing image display with aid of the liquid crystal panel 200.

With the light-emitting sets 21, the backlight module 100 can directly emit white lights without utilizing blue lights to excite a quantum dot film layer for conversion to obtain white lights. As such, there is no need to provide a quantum dot film layer compared to the related art, which can simplify the structure of the backlight module 100, reduce a production cost of the backlight module 100, and reduce difficulty in assembling of the backlight module 100.

Figure 4:
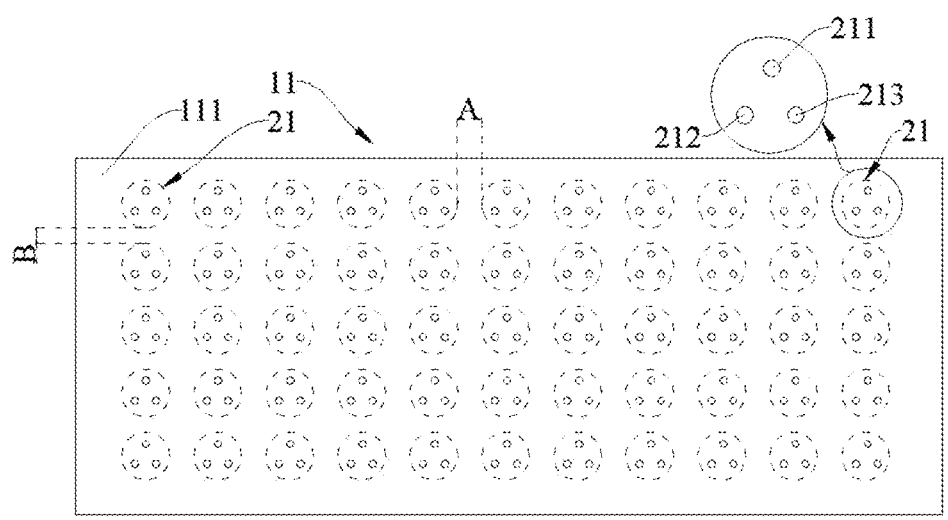
FIG. 4 is a schematic structural view illustrating a backplate and light-emitting sets each having three lamp sources provided in implementations of the disclosure.

Referring to FIG. 3 and FIG. 4, FIG. 4 is a schematic structural view illustrating a backplate 10 and light-emitting sets 21 each having three lamp sources provided in implementations of the disclosure. The light-emitting sets 21 provided in the disclosure each may have at least two lamp sources. The lamp source of the light-emitting sets 21 may be a Mini Light Emitting Diode (Mini LED). The following will give two implementations to explain possible configurations of lamp sources for the light-emitting set 21 that can realize emission of a white light.

Implementation I

Figure 5:
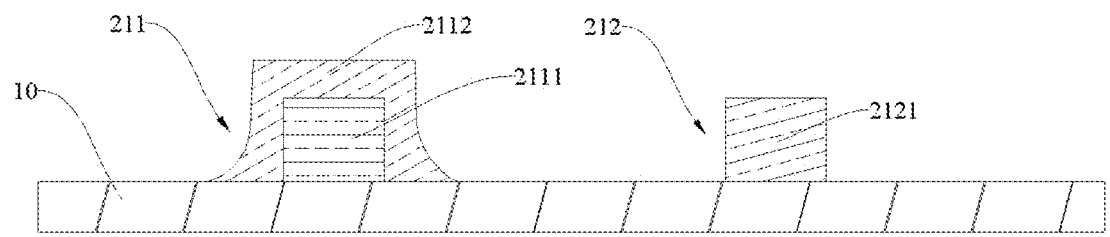
FIG. 5 is a schematic cross-sectional view illustrating a backplate and a light-emitting set having two lamp sources illustrated in FIG. 3.

Referring to FIG. 5, FIG. 5 is a schematic cross-sectional view illustrating a backplate 10 and a light-emitting set 21 having two lamp sources illustrated in FIG. 3.

In a possible implementation, the light-emitting sets 21 each include a first lamp source 211 and a second lamp source 212. The first lamp source 211 includes a first light-emitting layer 2111 and a second light-emitting layer 2112. The second light-emitting layer 2112 can be disposed on a periphery of the first light-emitting layer 2111 to encapsulate the first light-emitting layer 2111. The first light-emitting layer 2111 and the second light-emitting layer 2112 are configured to emit different colors to cooperate to emit a first light (not illustrated) of the first lamp source 211. The second lamp source 212 includes a third light-emitting layer 2121. The third light-emitting layer 2121 emits a color different from each of the first light-emitting layer 2111 and the second light-emitting layer 2112. The second lamp source 212 is configured to emit a second light (not illustrated). The first light is different from the second light in color.

It is to be noted that, the first light-emitting layer 2111 and the third light-emitting layer 2121 each may be made of a semiconductor material, and each can emit a light when a current is applied. The color of the emitted light depends on the material of the light-emitting layer. Exemplarily, a light-emitting layer made of Indium Gallium Nitride (InGaN) can emit a blue light, a light-emitting layer made of nitride or fluoride can emit a red light, and a light-emitting layer made of silicate can emit a green light.

The second light-emitting layer 2112 may include an encapsulation adhesive (not illustrated) and a phosphor (not illustrated). Phosphors of different materials can make the second light-emitting layer 2112 emit lights of different colors. The second light-emitting layer 2112 is disposed around the first light-emitting layer 2111 to encapsulate the first light-emitting layer 2111, which can isolate the first light-emitting layer 2111 and components in the driving circuit from external vapor and oxygen, thereby preventing the first light-emitting layer 2111 and the driving circuit from being eroded by external vapor and being oxidized by oxygen.

In a specific application scenario, the first light-emitting layer 2111 can emit a red light, the second light-emitting layer 2112 can emit a green light, and the first light-emitting layer 2111 and the second light-emitting layer 2112 cooperate to emit the first light, where the first light is yellow. The third light-emitting layer 2121 can emit a blue light, and thus the second light is blue. The first light and the second light are added together to obtain a white light.

In another specific application scenario, the first light-emitting layer 2111 can emit a red light, the second light-emitting layer 2112 can emit a blue light, and the first light-emitting layer 2111 and the second light-emitting layer 2112 cooperate to emit the first light, where the first light is magenta. The third light-emitting layer 2121 can emit a green light, and thus the second light is green. The first light and the second light are added together to obtain a white light.

In still another specific application scenario, the first light-emitting layer 2111 can emit a blue light, the second light-emitting layer 2112 can emit a red light, and the first light-emitting layer 2111 and the second light-emitting layer 2112 cooperate to emit the first light, where the first light is magenta. The third light-emitting layer 2121 can emit a green light, and thus the second light is green. The first light and the second light are added together to obtain a white light. It should be noted that, colors of lights emitted by respective light-emitting layers may have other combinations, which are not limited in the disclosure.

Figure 6:
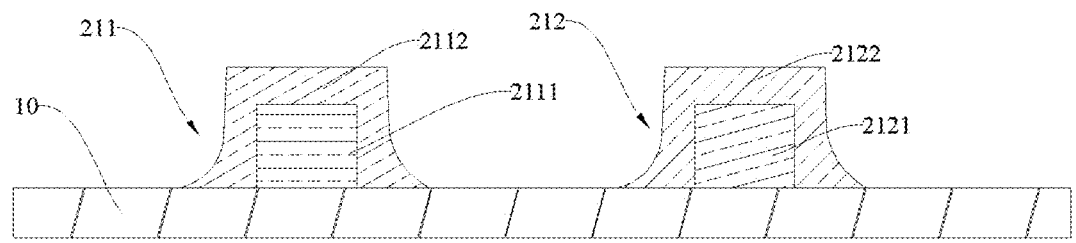
FIG. 6 is a schematic cross-sectional view illustrating a backplate and another light-emitting set having two lamp sources illustrated in FIG. 3.

Referring to FIG. 6, FIG. 6 is a schematic cross-sectional view illustrating a backplate 10 and another light-emitting set 21 having two lamp sources illustrated in FIG. 3.

In another possible implementation, different from the previous implementation, the second lamp source 212 further includes a fourth light-emitting layer 2122. The same content as in the previous implementation will not be described in detail again herein. The fourth light-emitting layer 2122 can be disposed on a periphery of the third light-emitting layer 2121 to encapsulate the third light-emitting layer 2121. The third light-emitting layer 2121 and the fourth light-emitting layer 2122 are configured to emit different colors to cooperate to emit the second light of the second lamp source 212. The second light is different from the first light in color.

In a specific application scenario, the first light-emitting layer 2111 can emit a red light, the second light-emitting layer 2112 can emit a green light, and the first light-emitting layer 2111 and the second light-emitting layer 2112 cooperate to emit the first light, where the first light is yellow. The third light-emitting layer 2121 can emit a red light, the fourth light-emitting layer 2122 can emit a blue light, and thus the second light is magenta. The first light and the second light are added together to obtain a white light.

In another specific application scenario, the first light-emitting layer 2111 can emit a blue light, the second light-emitting layer 2112 can emit a red light, and the first light-emitting layer 2111 and the second light-emitting layer 2112 cooperate to emit the first light, where the first light is magenta. The third light-emitting layer 2121 can emit a blue light, the fourth light-emitting layer 2122 can emit a green light, and the third light-emitting layer 2121 and the fourth light-emitting layer 2122 cooperate to emit the second light, where the second light is cyan. The first light and the second light are added together to obtain a white light.

In still another specific application scenario, the first light-emitting layer 2111 can emit a green light, the second light-emitting layer 2112 can emit a red light, and the first light-emitting layer 2111 and the second light-emitting layer 2112 cooperate to emit the first light, where the first light is yellow. The third light-emitting layer 2121 can emit a green light, the fourth light-emitting layer 2122 can emit a blue light, and the third light-emitting layer 2121 and the fourth light-emitting layer 2122 cooperate to emit the second light, where the second light is cyan. The first light and the second light are added together to obtain a white light.

It is to be noted that, the first light-emitting layer 2111, the second light-emitting layer 2112, and the third light-emitting layer 2121 are implemented in the same manner as in the previous implementation, which will not be described in detail again herein. The fourth light-emitting layer 2122 is disposed around the third light-emitting layer 2121 to encapsulate the third light-emitting layer 2121, which can isolate the third light-emitting layer 2121 and components in the driving circuit from external vapor and oxygen, thereby preventing the third light-emitting layer 2121 and the corresponding driving circuit from being eroded by external vapor and being oxidized by oxygen. The fourth light-emitting layer 2122 may include an encapsulation adhesive and a phosphor, where the color of the phosphor may be, but is not limited to, red, green, or blue.

It can be understood that, in this implementation, the first light-emitting layer 2111 and the third light-emitting layer 2121 may be made of the same material, and thus the first light-emitting layer 2111 and the third light-emitting layer 2121 can emit the same color. During preparation, the first light-emitting layer 2111 and the second light-emitting layer 2112 can be prepared under the same process technique, to simplify process techniques and reduce production processes. The material of the second light-emitting layer 2112 is different from that of the fourth light-emitting layer 2122, and thus the second light-emitting layer 2112 and the fourth light-emitting layer 2122 can emit different colors. The first light-emitting layer 2111 and the second light-emitting layer 2112 can cooperate to emit the first light, and the third light-emitting layer 2121 and the fourth light-emitting layer 2122 can cooperate to emit the second light. The first light is different from the second light in color. The first light and the second light can be added together to obtain a white light.

It is to be noted that, the material of the first light-emitting layer 2111 may be different from that of the second light-emitting layer 2112, and the third light-emitting layer 2121 and the fourth light-emitting layer 2122 may be made of the same material, as long as a white light can be obtained by mixing the first light and the second light. The implementation is not limited in this regard.

Implementation II

Referring to FIG. 4 again, different from implementation I, each light-emitting set 21 includes a first lamp source 211, a second lamp source 212, and a third lamp source 213. The same content as in implementation I will not be described in detail again herein. The first lamp source 211, the second lamp source 212, and the third lamp source 213 each are configured to emit one of a blue light, a red light, or a green light, and the first lamp source, the second lamp source, and the third lamp source are configured to emit different colors. In this implementation, each of the first lamp source 211, the second lamp source 212, and the third lamp source 213 for example includes only one light-emitting layer. Exemplarily, a light-emitting layer of the first lamp source 211 is made of InGaN, a light-emitting layer of the second lamp source 212 is made of nitride or fluoride, and a light-emitting layer of the third lamp source 213 is made of silicate.

In a possible implementation, an encapsulation layer is disposed around the light-emitting layer of the first lamp source 211, an encapsulation layer is disposed around the light-emitting layer of the second lamp source 212, and an encapsulation layer is disposed around the light-emitting layer of the third lamp source 213. The encapsulation layers can isolate the light-emitting layers and components in the driving circuit from external vapor and oxygen, and prevent the light-emitting layer and corresponding driving circuit from being eroded by external vapor and being oxidized by oxygen, and therefore can provide good protection.

In this implementation, the first lamp source 211, the second lamp source 212, and the third lamp source 213 of the light-emitting set 21 may be arranged in triangle. Multiple sets of the first lamp source 211, the second lamp source 212, and the third lamp source 213 (i.e., multiple light-emitting sets) may be arranged in the same manner. Exemplarily, the first lamp source 211, the second lamp source 212, and the third lamp source 213 may be arranged in equilateral triangle, or may be arranged in straight line. The manner of arrangement of the first lamp source 211, the second lamp source 212, and the third lamp source 213 is not limited in the disclosure, as long as the first lamp source 211, the second lamp source 212, and the third lamp source 213 can cooperate to emit a white light.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A backlight module, comprising:
a backplate and a plurality of light-emitting sets, the plurality of light-emitting sets being fixedly coupled to the backplate and arranged in array on the backplate;
the backlight module further comprising a diffuser plate and an optical film that are stacked, the plurality of light-emitting sets being disposed in a gap between the diffuser plate and the backplate, the plurality of light-emitting sets each comprising at least two lamp sources, and the at least two lamp sources being configured to emit different colors to cooperate to emit a white light; wherein
the plurality of light-emitting sets each comprises a first lamp source and a second lamp source, the first lamp source comprises a first light-emitting layer and a second light-emitting layer, and the second light-emitting layer encloses the first light-emitting layer, wherein the first light-emitting layer and the second light-emitting layer are configured to emit different colors to cooperate to emit a first light of the first lamp source, the second lamp source is configured to emit a second light, and the first light is different from the second light in color; and
the second lamp source comprises a third light-emitting layer and a fourth light-emitting layer, the fourth light-emitting layer encloses the third light-emitting layer, the third light-emitting layer and the fourth light-emitting layer are configured to emit different colors to cooperate to emit the second light of the second lamp source, and the second light is different from the first light in color.

2. The backlight module of claim 1, wherein
the first light-emitting layer is configured to emit a red light, the second light-emitting layer is configured to emit a green light, and the first light is yellow; the second light is blue; or
the first light-emitting layer is configured to emit a red light, the second light-emitting layer is configured to emit a blue light, and the first light is magenta; the second light is green.

3. The backlight module of claim 1, wherein
the first light-emitting layer is configured to emit a red light, the second light-emitting layer is configured to emit a green light, and the first light is yellow; the third light-emitting layer is configured to emit a red light, the fourth light-emitting layer is configured to emit a blue light, and the second light is magenta; or
the first light-emitting layer is configured to emit a blue light, the second light-emitting layer is configured to emit a red light, and the first light is magenta; the third light-emitting layer is configured to emit a blue light, the fourth light-emitting layer is configured to emit a green light, and the second light is cyan; or
the first light-emitting layer is configured to emit a green light, the second light-emitting layer is configured to emit a red light, and the first light is yellow; the third light-emitting layer is configured to emit a green light, the fourth light-emitting layer is configured to emit a blue light, and the second light is cyan.

4. The backlight module of claim 1, wherein the plurality of light-emitting sets each further comprises a third lamp source, wherein the first lamp source, the second lamp source, and the third lamp source each are configured to emit one of a red light, a green light, or a blue light, and the first lamp source, the second lamp source, and the third lamp source are configured to emit different colors to cooperate to emit a white light.

5. The backlight module of claim 1, wherein the backplate comprises a driving circuit, the driving circuit is coupled with the plurality of light-emitting sets and is capable of adjusting a current of each light-emitting set separately.

6. The backlight module of claim 1, wherein the backlight module further comprises a module support, the backplate comprises a first part and a second part, the first part is connected with the second part in a bending manner, and the second part is fixedly connected with the module support.

7. The backlight module of claim 6, wherein the diffuser plate and the optical film each have one end coupled with the second part of the backplate, and the diffuser plate is disposed opposite to the first part of the backplate.

8. The backlight module of claim 1, further comprising a support member, wherein the support member has a first end coupled with a surface of the backplate provided with the lamp sources, and a second end coupled with a surface of the diffuser plate closer to the light-emitting sets.

9. A display panel, comprising:
a backlight module comprising:
a backplate;
a diffuser plate;
an optical film, stacked on the diffuser plate; and
a plurality of light-emitting sets, fixedly coupled to the backplate and arranged in array on the backplate, and disposed in a gap between the diffuser plate and the backplate, the plurality of light-emitting sets each comprising at least two lamp sources, and the at least two lamp sources being configured to emit different colors to cooperate to emit a white light; wherein
the plurality of light-emitting sets each comprises a first lamp source and a second lamp source, the first lamp source comprises a first light-emitting layer and a second light-emitting layer, and the second light-emitting layer encloses the first light-emitting layer, wherein the first light-emitting layer and the second light-emitting layer are configured to emit different colors to cooperate to emit a first light of the first lamp source, the second lamp source is configured to emit a second light, and the first light is different from the second light in color; and
the second lamp source comprises a third light-emitting layer and a fourth light-emitting layer, the fourth light-emitting layer encloses the third light-emitting layer, the third light-emitting layer and the fourth light-emitting layer are configured to emit different colors to cooperate to emit the second light of the second lamp source, and the second light is different from the first light in color; and
a liquid crystal panel, disposed opposite to the backlight module and configured to receive a light emitted by the backlight module for image display.

10. The display panel of claim 9, wherein
the first light-emitting layer is configured to emit a red light, the second light-emitting layer is configured to emit a green light, and the first light is yellow; the second light is blue; or
the first light-emitting layer is configured to emit a red light, the second light-emitting layer is configured to emit a blue light, and the first light is magenta; the second light is green.

11. The display panel of claim 9, wherein
the first light-emitting layer is configured to emit a red light, the second light-emitting layer is configured to emit a green light, and the first light is yellow; the third light-emitting layer is configured to emit a red light, the fourth light-emitting layer is configured to emit a blue light, and the second light is magenta; or
the first light-emitting layer is configured to emit a blue light, the second light-emitting layer is configured to emit a red light, and the first light is magenta; the third light-emitting layer is configured to emit a blue light, the fourth light-emitting layer is configured to emit a green light, and the second light is cyan; or
the first light-emitting layer is configured to emit a green light, the second light-emitting layer is configured to emit a red light, and the first light is yellow; the third light-emitting layer is configured to emit a green light, the fourth light-emitting layer is configured to emit a blue light, and the second light is cyan.

12. The display panel of claim 9, wherein the plurality of light-emitting sets each further comprises a third lamp source, wherein the first lamp source, the second lamp source, and the third lamp source each are configured to emit one of a red light, a green light, or a blue light, and the first lamp source, the second lamp source, and the third lamp source are configured to emit different colors to cooperate to emit a white light.

13. The display panel of claim 9, wherein the backplate comprises a driving circuit, the driving circuit is coupled with the plurality of light-emitting sets and is capable of adjusting a current of each light-emitting set separately.

14. The display panel of claim 9, wherein the backlight module further comprises a module support, the backplate comprises a first part and a second part, the first part is connected with the second part in a bending manner, and the second part is fixedly connected with the module support.

15. The display panel of claim 14, wherein the diffuser plate and the optical film each have one end coupled with the second part of the backplate, and the diffuser plate is disposed opposite to the first part of the backplate.

16. The display panel of claim 9, wherein the backlight module further comprises a support member, wherein the support member has a first end coupled with a surface of the backplate provided with the lamp sources, and a second end coupled with a surface of the diffuser plate closer to the light-emitting sets.

* * * * *